Figure 1:
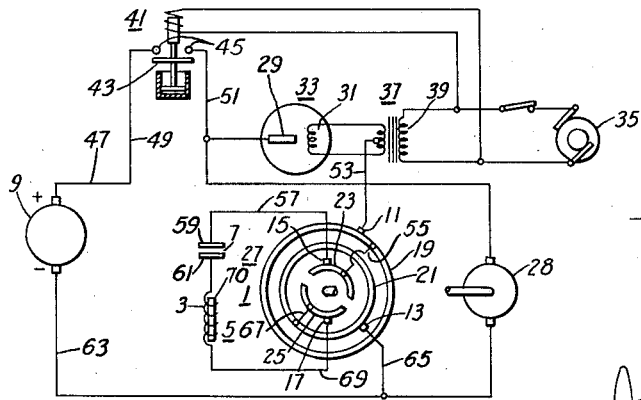

Oct. 24, 1933.   J. W. DAWSON   1,932,033
RECIPROCATING MOTOR
Filed Feb. 28, 1931

WITNESSES:

INVENTOR
John W. Dawson
BY
ATTORNEY

Patented Oct. 24, 1933

1,932,033

UNITED STATES PATENT OFFICE 1,932,033

RECIPROCATING MOTOR

John W. Dawson, Wilkinsburg, Pa., assignor to Westinghouse Electric & Manufacturing Company, a corporation of Pennsylvania Application February 28, 1931
Serial No. 518,937

17 Claims. (Cl. 172—240)

My invention relates to reciprocating motors and has particular relation to control systems utilized in the operation of reciprocating motors.

A control system for a reciprocating motor, constructed according to the teachings of the prior art, ordinarily comprises a source of electrical energy and a device for modifying the source in such manner that pulsations of predetermined periodicity are produced in the windings of the motor. In general, a rotating switch is incorporated in the system for interrupting the current from the source.

In the operation of reciprocating motors constructed according to the teachings of the prior art, considerable difficulty has been encountered. The current through the winding is, in general, a matter of several amperes and, consequently, when it is interrupted by a reversing switch, an arc is produced at the point of interruption which causes deterioration of the brushes and the segments of the switch by the heat thus generated.

It is, accordingly, an object of my invention to provide a control system for a reciprocating motor, of the type incorporating a reversing switch, wherein the current traversing the windings of the motor may be interrupted without arcing at the interrupting contacts.

Another object of my invention is to provide means for deriving from a source of continuous electromotive force, an intermittent current of large value without arcing at the separated contacts or other operating troubles, and without employing expensive circuit breakers.

A further object of my invention is to provide a control system for a reciprocating motor that will supply a periodic pulsating current to the windings of the motor that shall have a zero value during an appreciable interval in each periodic pulse.

A further object of my invention is to provide a system for controlling the magnitude of the current through the windings of a reciprocating motor, of a type including a rotary reversing switch, said current having such characteristic that the brushes of the switch pass from one segment of the switch to another during the interval when the current through the brushes and the segments is substantially zero.

An ancillary object of my invention is to provide a system for translating power of given characteristics of frequency and amplitude into a system having other predetermined characteristics of frequency and amplitude.

A further ancillary object of my invention is to provide a control circuit for producing a power supply of predetermined characteristics of frequency and amplitude from a power source of given characteristics of frequency and amplitude, of a type incorporating a reversing switch that shall interrupt and reverse a current of considerable average magnitude without arcing.

A still further ancillary object of my invention is to provide a non-arcing switching device for translating current pulsations from a plurality of given characteristics to a plurality of other predetermined characteristics.

An incidental object of my invention is to provide for a translating system of the type incorporating a reversing switch, a starting device whereby the rotation of the switch shall be initiated in such manner that its angular position shall bear a predetermined relation to the translated pulses produced.

More concisely stated, it is an object of my invention to provide a control system for a reciprocating motor, of a type whereby half-cycle pulses of current are supplied to the windings of the motor in a periodic sequence; an appreciable period, wherein zero current passes through the windings, between successive pulses of current.

According to my invention, I provide a control system of a type including a capacitor connected in series with the windings of the motor. The capacitor is charged from a source of electrical energy through an asymmetric conductor and through the windings of the motor. When the capacitor has attained a charged condition, it is prevented from discharging by reason of the fact that the asymmetric conductor is substantially an open circuit for the discharging current. At this point, the current through the windings of the reciprocating motor is substantially zero.

When the charged condition has persisted for a predetermined time, the segments and the brushes of a reversing switch, connected in series with the asymmetric conductor, with the windings of the motor and with the capacitor, reverses the current in the circuit comprising the capacitor and the windings of the motor. As a result, the potential impressed on the capacitor is now of such polarity relative to the electrodes of the asymmetric conductor that it offers a comparatively low impedance to the discharging current.

A pulse of current, therefore, flows through the windings of the motor, and the capacitor is discharged and subsequently receives a charge of opposite polarity. After the capacitor has been discharged and recharged in the opposite sense, the current through the windings is again zero for a predetermined period of time, after which the reversing switch attains such condition as to permit the capacitor to go through a similar cycle in the opposite sense. This state of affairs is continued as long as the motor is in operation, and a pulsating current of predetermined periodicity is produced in the windings of the reciprocating motor.

The mechanical analogy of the electrical system described hereinabove may be represented by a system incorporating a spring capable of response to both tension and compression and coupled to a mass. The mass is under the action of a periodic force that alternately tensions and compresses the spring.

It will be noted that the control system constructed according to my invention comprises substantially an oscillating circuit, of which the principal elements are the capacitor and the windings of the motor, an asymmetric conductor in series therewith that prevents the current in the circuit from oscillating after the first half cycle, and a reversing switch that permits the first half cycle of the discharging oscillations to flow through the windings of the motor after the current through them has become substantially zero.

The current flowing through the reversing switch at the time when the reversal takes place is always zero, and, in consequence thereof, no arcing is produced at the terminals.

Figure 2:
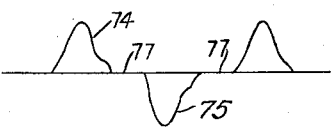
Figure 3:
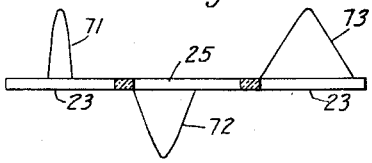
Figure 4:
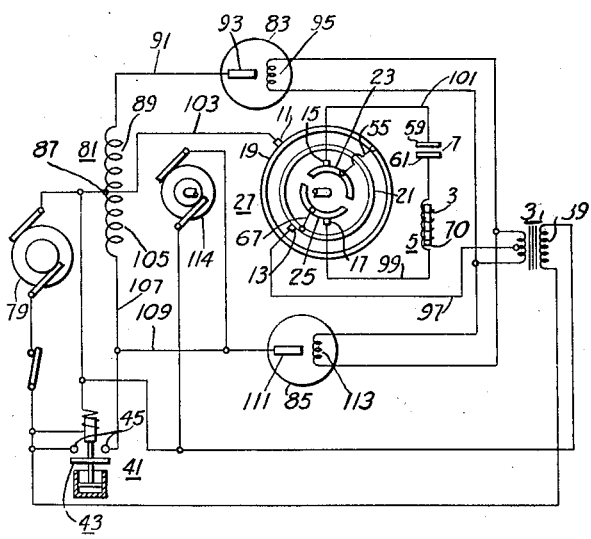
Figure 5:

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which Figure 1 is a diagrammatic view showing the principal elements of an embodiment of my invention, Fig. 2 is a graph, in which is shown the pulses traversing the windings of the reciprocating motor in Fig. 1, as a function of time, Fig. 3 is a schematic view showing graphically the operation of the system when the reversing switch is starting, Fig. 4 is a diagrammatic view showing a modification of my invention, and Fig. 5 is a graph showing the current characteristic of the apparatus illustrated and corresponds to the graph shown in Fig. 2.

The apparatus shown in Fig. 1 comprises an oscillatory circuit 1 including the windings 3 of a reciprocating motor 5 and a capacitor 7. The circuit 1 is supplied with power from a source 9 (which is preferably a direct-current source, although, for certain purposes, it may be desirable to employ an alternating-current source), through the brushes 11, 13, 15 and 17, the conducting rings 19 and 21 and the conducting segments 23 and 25 of a rotary reversing switch 27, driven from a motor 28, and through the electrodes 29 and 31 of an asymmetric conductor 33, such as a thermionic rectifier.

A heating current for the filament of the rectifier is supplied from an alternating-current-power source 35 through a transformer 37, the primary 39 of which is connected in parallel with a time-delay relay 41. The contactor 43 of the relay 41 is adapted to close the circuit through the direct-current generator 9, the asymmetric conductor 33, the reversing switch 27 and the elements of the oscillatory circuit 1. It is, furthermore, adapted to close the circuit through the motor 28 that rotates the reversing switch 27.

The time-delay relay 41 has such period of operation that the contactor 43 does not engage its fixed contacts 45 until the filament 31 of the rectifier 33 attains the proper temperature for emission. However, when the movable contactor 43 of the time-delay relay engages the corresponding fixed contactors 45, the circuit through the rectifier 33 is closed, and pulsations of current pass through the windings 3 of the motor 5.

When the reversing switch 27 is in the position shown in Fig. 1, the charging current passes from the generator 9, through a lead 47, a lead 49, the movable contactor 43 of the time-delay relay 41, a lead 51, the electrodes 29 and 31 of the rectifier 33, a lead 53, the brush 11 of the reversing switch 27, the conducting ring 19 of the reversing switch, a conducting bar 55, conducting segment 23, the brush 15 associated with the conducting segment 23 and a lead 57, to one plate 59 of the capacitor 7.

The other plate 61 of the capacitor 7 is charged from the generator 9 through a lead 63, a lead 65, the brush 13 associated with the conducting ring 21 of the reversing switch 27, a bar 67 connecting the ring 21 to the conducting segment 25, the brush 17 associated with the conducting segment 25, a lead 69 and the winding 3 of the reciprocating motor 5, to the plate 61 of the capacitor 7.

The capacitor 7 is thus charged, and, after it is charged, zero current is flowing through the windings 3 of the reciprocating motor 5. When this condition has persisted for a predetermined period of time, the segments 23 and 25 of the reversing switch 27 are moved to such positions that their relations to the brushes 15 and 17 are interchanged.

The discharging and inversely recharging circuit is then completed from the generator 9, through the lead 47, the lead 49, the movable contactor 43 of the time-delay relay 41, the lead 51, the electrodes 29 and 31 of the rectifier 33, the lead 53, the brush 11 associated with the ring 19 of the reversing switch 27, the bar 55, the brush 17, now in contact with the reversing segment 23, the lead 69 and the exciting windings 3 of the motor 5, to the plate 61 of the capacitor 7 that was previously charged negatively.

The positive plate 59 of the capacitor is now discharged, through the circuit comprising the generator 9, the lead 63 associated with the negative terminal thereof, the lead 65, the brush 13 associated with the conductor ring 21 of the reversing switch 27, the ring 21, the bar 67 connecting the ring 21 to its associated reversing segment 25, the brush 15, now in contact with the reversing segment 25 and the lead 57, to the plate 59 of the capacitor 7.

The capacitor thus discharges and recharges in the opposite sense, and a pulse of current passes through the windings 3 of the reciprocating motor 5.

It will be noted that the two pulses are of opposite polarity, and that, in consequence thereof, the magnetic polarity of the solenoidal winding 3 is reversed. However, the core 70 of the motor 5 is ordinarily constructed of steel of low retentivity and, in consequence thereof, the electromagnetic force exerted on the core 70 by the winding 3 is substantially rectified and the frequency of oscillation of the core is twice the cyclic frequency of the pulsations.

It is of course to be kept in mind that a restoring force is in practice always provided for returning the core 70 of the motor 5 to its initial position after it has been actuated by the electromagnetic force produced by the energized coil 3. This force may be simply the force of gravity on the core, or the core may be secured to a spring which is tensioned under the action of the electromagnetic field and restores the core to its normal position when the electromagnetic field disappears. By reason of the low retentivity of the steel of the core the electromagnetic force always acts in the same direction (i. e. opposing the restoring force) and as a result the frequency of oscillation of the core 6 is double the frequency of the current producing the electromagnetic force.

In Fig. 2 the characteristic curve of the current through the windings of the motor is illustrated. As may be seen from the curve, the pulsations 74 and 75 of current are produced periodically, and a period 77 of zero current is interposed between successive pulses. It should be borne in mind that the switch 27 reverses during these periods of zero current.

It should be kept in mind that the circuit through the motor 28 that drives the reversing switch 27 is coupled through the contactor 43 of the time-delay relay 41. By reason of this arrangement of the apparatus, the period of reversal of the current is, in practically every case, started in step with the pulsations through the windings 3 of motor 5, regardless of the initial position of the brushes 15 and 17 relative to the segments 23 and 25.

The motor 28 gradually increases in speed when it is started and, when it is rotating at a comparatively low velocity, the pulses of current passing between the brushes 15 and 17 and the segments 23 and 25 have a wave length that extends over a comparatively small portion of the length of the segments. Hence, if, at the beginning of the first pulse, a brush is in engagement with a segment at some distance from its end, the pulse, being comparatively attenuated, dies to zero amplitude before the brush becomes disengaged from the segment. The next pulse, on the other hand, starts at the instant when the brush in question engages the remaining segment.

In Fig. 3, the above-described phenomenon is illustrated graphically. The magnitude of the three current pulses 71, 72 and 73 are plotted as a function of the displacement of the segments 23 and 25, which are shown as developed in this view.

In Fig. 4, my invention is shown as applied to the operation of a reciprocating motor from an alternating-current source 79. The current from the power source 79 is supplied through an auto-transformer 81 and through a plurality of rectifiers 83 and 85 arranged in push-pull relationship in such manner that an effect of full-wave rectification of the power supply is produced.

During one-half cycle of current of the power source 79, the capacitor 7 is connected in a circuit extending from the electrical center 87 of the auto-transformers 81, through one winding 89 of the transformer, a lead 91, the electrodes 93 and 95 of one rectifier 83, a lead 97, the brush 13 associated with a ring 21 of the reversing switch 27, the ring 21, the bar 67 connecting the ring 21 of the reversing switch 27 to one reversing segment 25 thereof, the segment 25, the brush 17 associated with the segment 25, a lead 99 and the windings 3 of the reciprocating motor 5, to one plate 61 of the capacitor 7. The charging circuit is completed from the remaining plate 59 of the capacitor 7, through a lead 101, the brush 15 associated with a second segment 23 of the reversing switch 27, the segment 23, the conducting bar 55 connecting the segment 23 to the ring 19 of the reversing switch, the ring 19, the brush 11 associated with the ring 19 and a lead 103, to the electrical center 87 of the auto-transformer 81.

During the remaining half cycle of current from the alternating power source 79, the capacitor 7 is connected in the charging circuit extending from the electrical center 87 of the auto-transformer 81, through the lower windings 105 of the transformer, a lead 107, a lead 109, the electrodes 111 and 113 of the rectifier 85, the lead 97, the brush 13 engaging the ring 21 of the reversing switch 27, the ring 21, the conducting bar 67 connecting the ring 21 to the corresponding reversing segment 25, the brush 17 associated with the reversing segment, the lead 99 and the windings 3 of the reciprocating motor 5, to the plate 61 of the capacitor 7. The charging circuit is completed through the remaining plate 59 of the capacitor 7 in a circuit that includes the same elements as the charging circuit through the rectifier.

When the segments 23 and 25 of the reversing switch 27 rotate to such position that their relations to brushes 15 and 17 are interchanged, the capacitor 7 is discharged and inversely recharged through a circuit similar to the corresponding circuit of the capacitor associated with the direct-current system illustrated in Fig. 1. In this case, the ring 19 of the reversing switch 27 is connected to segment 23 which is associated with the plate 61 of the capacitor 7, and the ring 21 of the reversing switch 27 is associated with the segment 25 that is connected to the plate 59 of the capacitor 7. The capacitor is, therefore, discharged and recharged and a pulse of current passes through the exciting windings 3 of the reciprocating motor 5.

Finally, it should be noted that, in this case, the motor 114 should be preferably of the synchronous type, although an induction motor has been used with success. It will, furthermore, be seen that the motor circuit is completed through the contactor 43 of the time-delay relay 41. The reason for this arrangement has been given hereinabove.

In Fig. 5, the characteristic curve for the current through the windings of the motor supplied from an alternating-power source is shown. As may be seen from the curve, the general characteristic of the current is similar to the characteristic of the current in the direct-current system. However, waves 115 corresponding to the frequency of the source 79 are superposed on the half cycles 117 and 119 that surge through the exciting windings 3 of the motor 5.

My invention has been illustrated in a specific form in the above-described embodiments. It is to be noted that, essentially, it comprises an oscillating circuit 1 having a predetermined period that corresponds to the period of oscillation desired in the reciprocating motor 5. The desired period may be attained by connecting a capacitor 7 to the windings 3 of the reciprocating motor 5. It may also be attained by adding requisite inductors and capacitors in the circuit with the windings of the reciprocating motor.

The reversing switch 27 is chosen in such manner that its period of reversal corresponding to the period of oscillations of the circuit. By suitably selecting the constants of the oscillating circuit 1 and the characteristics of the reversing switch 27, any desired characteristic may be attained for the current through the exciting windings of the reciprocating motor.

While I have described my preferred arrangement as including an asymmetric conductor in series with the capacitor, an arrangement in which said conductor is omitted, or one, in which any device adapted to store electric energy with the accumulation of a counterelectromotive force replaces the capacitor, is within the purview of my invention.

Specifically, my invention provides a method for attaining a power supply of predetermined characteristics of frequency and amplitude from a power supply of given characteristics of frequency and amplitude by utilizing a reversing switch that is so associated with the translating circuit that no arcing occurs at its terminals.

My invention may be applied to other devices than reciprocating motors. It may be applied to any system where power of predetermined characteristics is required, and the reciprocating motor 5 might well be replaced by a transformer or by any other appliance of like nature.

In particular, it should be kept in mind that my invention may be applied to the production of multiple-phase current from single-phase current. In such case, a rotating switch is so connected to a system of transformers that it feeds the current into the primaries thereof in a requisite manner.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A control system for a reciprocating motor comprising an oscillatory circuit associated with the windings of said motor, a source of electrical energy for said circuit, an asymmetric conductor connected between said oscillatory circuit and said source, and a reversing switch connected between said asymmetric conductor and said oscillatory circuit.

2. A control system for a reciprocating motor comprising a capacitor connected in series with the winding of said motor, means for charging said capacitor, means for preventing said capacitor from discharging for a predetermined period of time, and means for discharging and inversely recharging said capacitor after said period of time.

3. A control system for a reciprocating motor comprising a capacitor connected in series with the windings of said motor, and means, including a reversing switch and an asymmetric conductor, for charging and discharging said capacitor in a predetermined cyclical sequence.

4. A control system for a reciprocating motor comprising a capacitor connected in series with the windings of said motor, means for charging said capacitor, means including an asymmetric conductor for preventing said capacitor from discharging for a predetermined period of time, and a reversing switch for discharging and inversely recharging said capacitor after said predetermined period of time.

5. The method of producing a pulsating current in the windings of a reciprocating motor with apparatus of a type including a capacitor and an asymmetric conductor, comprising the steps of charging said capacitor through said windings and said asymmetric conductor, causing said capacitor to remain in charged condition for a predetermined period of time, and discharging and inversely recharging said capacitor through said windings and through said asymmetric conductor after said predetermined period of time.

6. The method of producing a pulsating current in the windings of a reciprocating motor with apparatus of a type including a capacitor and an asymmetric conductor, comprising the steps of charging said capacitor through said windings and said asymmetric conductor, causing said capacitor to remain in charged condition for a predetermined period of time, and discharging and inversely recharging said capacitor through said windings and through said asymmetric conductor after said predetermined period of time, causing said capacitor to remain in its newly charged condition for a second predetermined period of time, and discharging and inversely recharging said conductor after said last mentioned predetermined period of time.

7. In a control system for a reciprocating motor, an oscillatory circuit associated with the windings of said motor, and means for producing half-wave pulses of current in said circuit in predetermined cyclical sequence, said means including an asymmetric conductor connected in series with said circuit and a reversing switch connected between said oscillatory circuit and said assymmetric conductor.

8. In a control system for a reciprocating motor, an oscillatory circuit associated with the windings of said motor, and means for producing half-wave pulses of current in said circuit in predetermined cyclical sequence, said means including an asymmetric conductor connected in series with said circuit and a rotary reversing switch connected between said oscillatory circuit and said asymmetric conductor.

9. An energy-translation system comprising a source of power, an asymmetric conductor connected in series with said source, an oscillatory circuit, the elements of said circuit being connected in series with said asymmetric conductor, and means for reversing the relation of the terminals of said oscillatory circuit to the electrodes of said asymmetric conductor.

10. An energy-translation system comprising a source of power, an asymmetric conductor connected in series with said source, an oscillatory circuit, the elements of said circuit being connected in series with said asymmetric conductor, means for reversing the relation of the terminals of said oscillatory circuit to the electrodes of said asymmetric conductor, and means for adapting said reversing means to operate in proper timed relationship to the oscillations of said circuit.

11. An energy-translation system comprising a source of power, an asymmetric conductor connected in series with said source, an oscillatory circuit, the elements of said circuit being connected in series with said asymmetric conductor, means for reversing the relation of the terminals of said oscillatory circuit to the electrodes of said asymmetric conductor, and means for simultaneously initiating the activity of said reversing means and said asymmetric conductor.

12. An energy-translation system comprising a source of power, an asymmetric conductor connected in series with said source, an oscillatory circuit, the elements of said circuit being connected in series with said asymmetric conductor, means for reversing the relation of the terminals of said oscillatory circuit to the electrodes of said asymmetric conductor and time-delay means for simultaneously initiating the activity of said reversing means and said asymmetric conductor.

13. A control system for a reciprocating motor of the type having exciting windings comprising a capacitor coupled to said windings, means for charging said capacitor to produce an exciting current in said windings, means for trapping on said capacitor the charge applied thereto during said charging operation, and means for discharging said capacitor after said charging operation has terminated.

14. A control system for a reciprocating motor of the type having an exciting element comprising energy storing means associated with said element, means for supplying energy to said energy storing means for a predetermined interval of time to excite said element, means for trapping said energy in said energy-storing means during the interval during which energy is being supplied thereto and means coupled to said trapping means for discharging said energy stored in said energy storing means after said interval of time to provide for a repetition of said storing operation.

15. A control system for a reciprocating motor of the type having exciting windings comprising a capacitor coupled to said windings, means for charging said capacitor to produce an exciting current in said windings, means for trapping on said capacitor the charge applied thereto during said charging operation, means for discharging said capacitor after said charging operation has terminated, and means for simultaneously rendering effective said charging means, said trapping means, and said discharging means to provide for the synchronous operation thereof.

16. A control system for a reciprocating motor of the type having exciting windings comprising a capacitor coupled to said windings, an asymmetric conductor including an excitable cathode associated with said exciting winding and said capacitor, means for energizing said cathode of said asymmetric conductor, means for charging said capacitor through said asymmetric conductor to energize said windings, means for discharging said capacitor after said charging operation has stopped and means for maintaining said asymmetric conductor, said capacitor, said charging means and said discharging means ineffective to cooperate with each other for a predetermined interval after said cathode has been energized to provide for the synchronous operation of said elements.

17. The method of producing a pulsating current in the windings of a reciprocating motor with apparatus of a type including a capacitor, an asymmetric conductor of the type having an excitable cathode and switching means of the type equipped with contact elements, comprising the steps of energizing said excitable cathode of said asymmetric conductor, connecting said asymmetric conductor to said capacitor through said switching means to charge said capacitor a predetermined period of time after the excitation of said cathode has been initiated, simultaneously actuating said switching means to operate slowly to provide for the transmission of only a single charging impulse through a continuous contact element thereof and thereafter to provide for the discharge of said capacitor through another contact element thereof and accelerating said switching means until it attains a predetermined velocity to provide for the periodic charge and discharge of said capacitor.

JOHN W. DAWSON.